United States Patent
Cameron (10) Patent No.: US 7,063,374 B1
(45) Date of Patent: Jun. 20, 2006

(54) SAFETY SHIELD WINDOW INSERT (76) Inventor: Allan Cameron, 94 Sciarappa St., Cambridge, MA (US) 02141

( * ) Notice: Subject to any disclaimer, the term of this patent is extended or adjusted under 35 U.S.C. 154(b) by 0 days.

(21) Appl. No.: 09/499,550

(22) Filed: Feb. 7, 2000

(51) Int. Cl.
F41H 5/013 (2006.01)
B60J 1/10 (2006.01)

(52) U.S. Cl. .............................. 296/152; 49/57; 49/61; 109/49.5; 89/36.02

(58) Field of Classification Search ................... 52/202; 49/62, 63, 50, 57, 61, 463; 296/152; 109/49.5
See application file for complete search history.

(56) References Cited

U.S. PATENT DOCUMENTS

| 3,855,898 | A | * | 12/1974 | McDonald | 89/36.08 |
| 3,923,339 | A | * | 12/1975 | McDonald | 296/95.1 |
| 4,454,691 | A | * | 6/1984 | Mitchell | 52/202 |
| 5,242,207 | A | * | 9/1993 | Carson et al. | 296/146.15 |
| 5,271,311 | A | * | 12/1993 | Madden, Jr. | 89/36.08 |
| 5,533,778 | A | * | 7/1996 | Sheridan | 296/152 |
| 5,570,542 | A | * | 11/1996 | Cameron | 49/463 |
| 5,594,193 | A | * | 1/1997 | Sheridan | 89/36.08 |
| 5,768,826 | A | * | 6/1998 | Wilcher et al. | 49/61 |
| 5,811,719 | A | * | 9/1998 | Madden, Jr. | 89/36.08 |
| 5,857,730 | A | * | 1/1999 | Korpi et al. | 296/146.1 |
| 6,012,257 | A | * | 1/2000 | Caplette | 52/202 |
| 6,047,500 | A | * | 4/2000 | Caplette | 49/466 |
| 6,604,776 | B1 | * | 8/2003 | Edwards | 296/152 |
| 6,630,235 | B1 | * | 10/2003 | Oshima et al. | 428/339 |
| 2005/0050812 | A1 | * | 3/2005 | Cameron | 52/204.1 |

* cited by examiner

Primary Examiner—Robert Canfield
(74) Attorney, Agent, or Firm—Grossman, Tucker, Perreault & Pfleger, PLLC (57) ABSTRACT

A safety device for an automobile. The safety device being a window insert designed to fit within the standard frame of a window and be retrained within the frame by the upper edge of the window insert, along with the window, fitting into the upper channel of the window frame and the bottom of the window insert fitting into and being retained by a bracket with the lower edge fitting between the window and the lower inside weather stripping of the window. The window insert can be installed in thirty seconds, requires no modification to the window, window frame, or door, and when in place the window may be raised or lowered at any time. The window insert may include orifices to allow air inflow and/or outflow so as to provide a continuous flow of fresh air into the vehicle. The safety device may be used to retain a child or a pet, and can be formed from a plastic, plexiglass, or polycarbonate material. Alternatively, the window insert may be formed from a high impact or bullet proof material.

10 Claims, 7 Drawing Sheets

SAFETY SHIELD WINDOW INSERT

BACKGROUND OF THE INVENTION

The present invention is directed to the field of automotive safety equipment. More particularly, the present invention is directed to a defeasible shield window insert that may be inserted and retained within an opening for an automotive window.

Automobile manufacturers are increasingly incorporating safety features into the design of automobiles, however, with respect to the windows on the automobile, the industry standard remains to simply use a glass window retracting into the door frame. One safety feature that has been incorporated has been the use of a locking device activated by the driver which can be used to prevent passenger windows from being opened. This device is primarily intended for limiting the ability of small children to open a passenger door window.

With respect to a first aspect of the present invention, there are few, if any, devices available to restrain a child or family pet, such as a dog or cat, from exiting through an open window, other than a cage or container. For the safety and comfort of the child or pet, it is clearly beneficial to allow a constant flow of fresh air into the vehicle. Currently, the only choice for parents, or pet owners, who wish to bring safety and comfort to their children and or pets; not confining them physically, or have concern about the amount of air flow, is to limit how far down the window is retracted; thus preventing the child or pet from exiting the window.

With respect to a second aspect of the invention, there has been increasing concern about, and awareness of, the vulnerability of a vehicular occupant to bodily injury or attack as a result of the relative ease of access to the occupant of a vehicle via the glass window of the door. Glass windows may easily be broken and provide little, if any, resistance to assault with a gun.

Currently, the only alternative for increasing the safety of a vehicle occupant with respect to the glass window is to have a custom modification of the vehicle done to install a so called "bullet-proof" window. Such custom modifications are both expensive and relatively uncommon, requiring extensive modifications to the door assembly. Accordingly, the installation of bullet proof windows in vehicles is not commonplace.

A first effort to address the foregoing issues was detailed in applicant's U.S. Pat. No. 5,470,542 issued Nov. 5, 1996, herein incorporated by reference. All of the claims of the U.S. Pat. No. 5,470,542 patent were based on a window insert that occupied the area normally occupied by the original window. The window insert fitted into the upper channel of the window frame and was retained in its place by the original window fitting into a groove running along the bottom of the insert.

The U.S. Pat. No. 5,470,542 patent's window insert retention system, and because the window insert took the place of the original window, greatly limited the use of the invention. The window could not be rolled up when the insert was in place, and the driver was compelled to stop and remove the insert during inclement weather, or to reduce the flow of air through the insert. The bullet proof window insert needs extensive and complicated weather proofing to be used in any inclement weather. Accordingly, it would be beneficial to have an alternative window insert that allows the car's windows to be rolled up and down while the insert remains in place.

SUMMARY OF THE INVENTION

The invention is directed to an insert formed from a clear or translucent material, adapted to be inset into, and retained by the window opening within conventional automobiles. With the first aspect of the invention the window insert was intended for use by parents and pet owners, and included a plurality of openings allowing venting of air for the benefit of children and pets, yet having the openings proportioned to prevent the child or pet from exiting the vehicle via the window. The material forming the window insert was preferably a plastic, such as a polycarbonate, or acrylic material.

In the second aspect of the invention the window insert is formed from a high impact resistant transparent material. The window insert is easily installed into the window frame and retained by the window itself. The high impact material forming the window insert is preferably a "bullet proof" material, such as a glass composite or glass-plastic composite.

For either of the two alternative aspects of the invention the window insert includes a mounting bracket which slips between and resides between the window and its lower inside weather-stripping. The window insert has an upper protruding edge, either integral, or separately attached, that is inserted into and shares with the window, the upper channel of the window frame. The window insert attaches to the mounting bracket with fasteners. The window insert sits on the inside of the window. At this point the window insert is fully installed and the window can be raised or lowered. The automobile can be driven with the insert in place, whether the window is rolled up or down. The mounting bracket can have different size offsets to allow for different thickness of the bulletproof window, allowing various levels of protection. The offset also allows for airflow between the window insert and the window, and prevents fogging. No attachments or modification of any kind have been made to the door, car windows, or window frames.

DETAILED DESCRIPTION OF THE PREFERRED EMBODIMENTS

Figure 1:
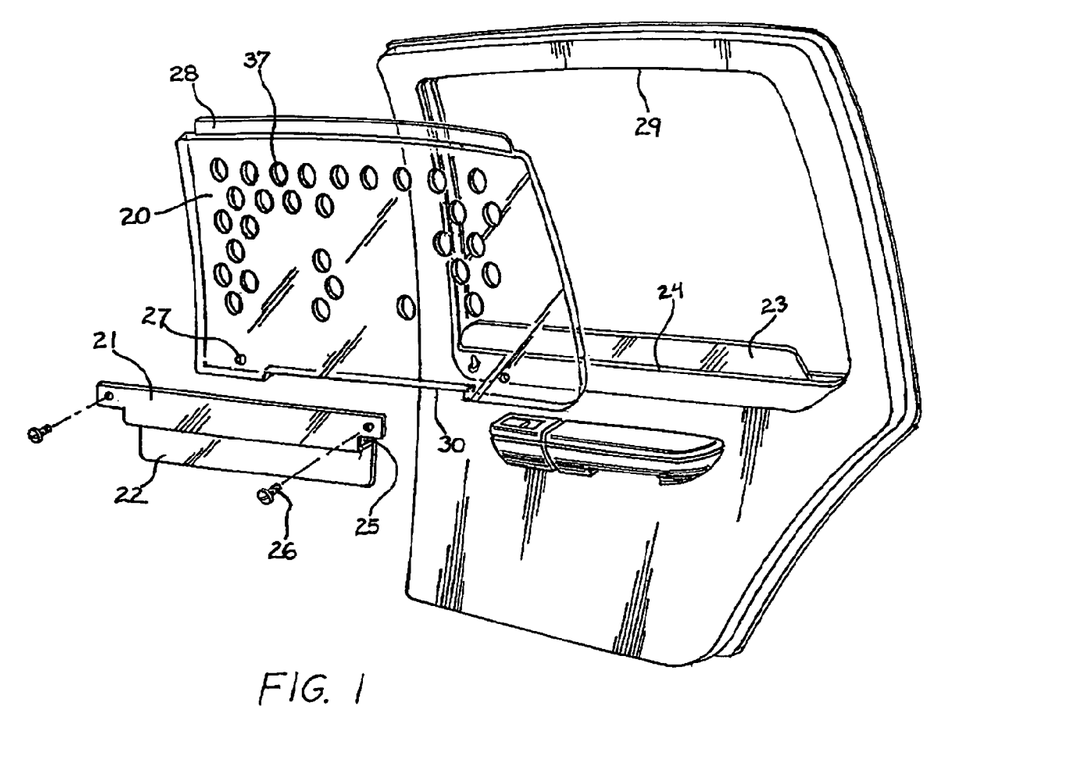
FIG. 1 is a perspective view of the window insert according to the first aspect of the present invention.

FIG. 1 depicts a window insert 20 according to a first aspect of the invention. The mounting bracket 21 has a bottom blade 22 sized to be insertable between a standard window 23 of an automobile and the lower inside weather-stripping 24 of the window 23. The mounting bracket 21 has a plane 25 upon which the window insert 20 rests. The mounting bracket 21 also has two fastening devices 26 which retain the window insert 20 having two fastening device receivers 27.

The window insert 20 has an upper protruding edge 28 sized to be insertable, along with the window 20, into the upper receiving channel 29 of the window frame of the automobile door. The insert has a notched bottom 30 to rest upon the mounting bracket plane 25 and two fastening device receivers 27 to retain the window insert 20 in the window frame of the automobile door.

Accordingly, it may be appreciated that to install the window insert 20 of the present invention, the window 23 is retracted, the bottom blade 22 of the mounting bracket 21 is inserted between the window 23 and the lower inside weatherstripping 24. The upper protruding edge 28 of the window insert 20 is inserted into the upper receiving channel 29 of the window frame, and the window insert's notched bottom 30 is rested on the mounting bracket plane 25. The window insert 20 is then retained in place by engaging the mounting bracket fastening device 26 with the window insert fastening device receiver 27. At this point, the window 23 may be raised or lowered as desired. It also may be appreciated that at no place has the window, window frame, or automobile door been modified or attached to.

Figure 2:
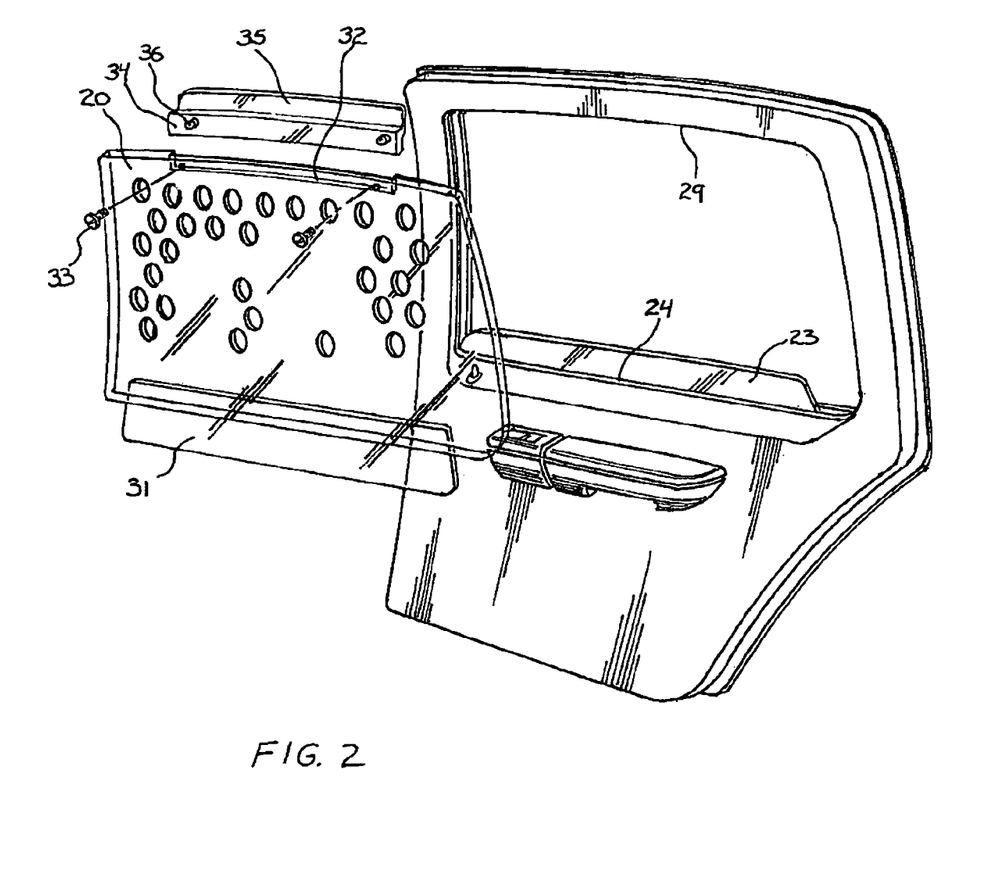
FIG. 2 is a perspective view of another embodiment of the window insert according to the first aspect of the present invention.

Similarly, FIG. 2 depicts another embodiment of the window insert 20 according to the first aspect of the invention. The window insert 20 has a bottom blade 31 which is sized to be insertable between a standard window 23 of an automobile and the lower inside weatherstripping 24 of the window 23. The top of the window insert 20 has a receiving edge 32 and fastening devices 33.

The top mounting bracket 34 has a protruding edge 35 sized to be insertable along with the window 23 into the upper receiving channel 29 of the window frame. The top mounting bracket 34 also has fastening device receivers 36.

Accordingly, it may be appreciated that to install this embodiment of the window insert 20 of the present invention, the window 23 is retracted. The bottom blade 31 of the window insert 20 is inserted between the window 23 and the lower inside weatherstripping 24. The top mounting bracket 34 is inserted into the upper receiving channel 29 of the window frame and is rested on the receiving edge 32 of the window insert 20. The window insert 20 is retained in the window frame by engaging the window insert fastening device 33 and the tip mounting bracket fastening device receivers 36. At this point the window 23 may be raised or lowered as desired and no modification have been made to the car window, window frame, or automobile.

In the first aspect of the present invention, wherein the window insert is used primarily to retain childred or pets, it is preferred to include at least one and potentially a plurality of holes or orifices 37, within the window insert 20 so that airflow can be facilitated. In the most basic embodiment of the invention, the orifices 37 may be simply circular openings cut perpendicular to the plane faces of the window insert, as shown in FIG. 1.

Figures 3, 4:
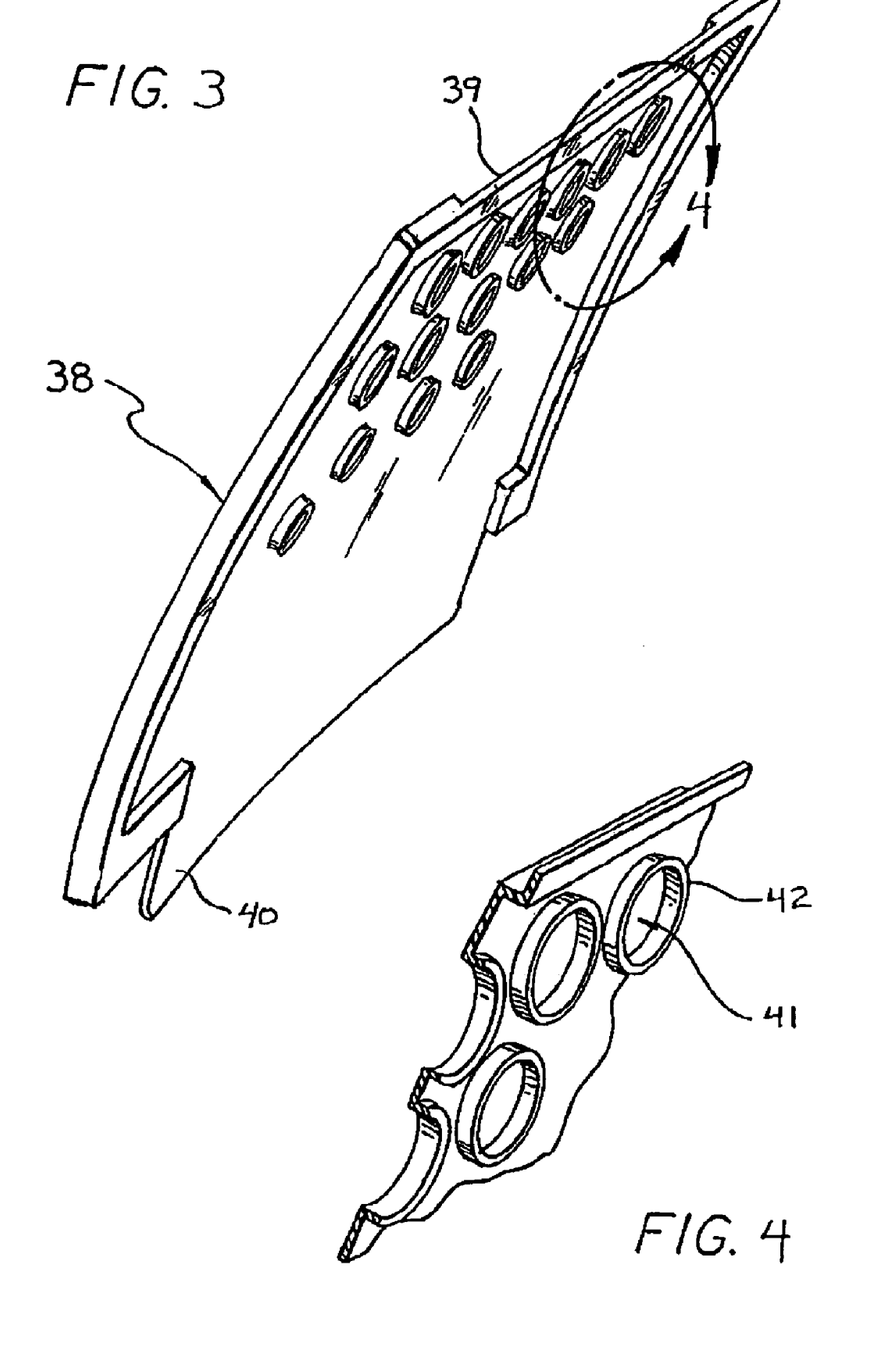
FIG. 3 is a perspective of an alternate embodiment of the window insert.
FIG. 4 is an alternative design for the orifices of the window insert.

FIG. 3 is a perspective view of another alternative embodiment for a window insert 38, and FIG. 4 shows an enlarged perspective view identified by circle 4—4 in FIG. 3. In the design according to FIGS. 3 and 4, the window insert 38 is formed to define a stepped pocket 39 to accept the top mounting bracket, and a blade 40 at the lower edge to be insertable between the window and the lower inside weatherstripping. In addition the window insert 38 may include orifices 41 having a circumferential ridge 42, which defines and further strengthens the window insert 38. The design of FIGS. 3 and 4 is particularly well suited to manufacture using a vacuum molding technique.

Figure 5:
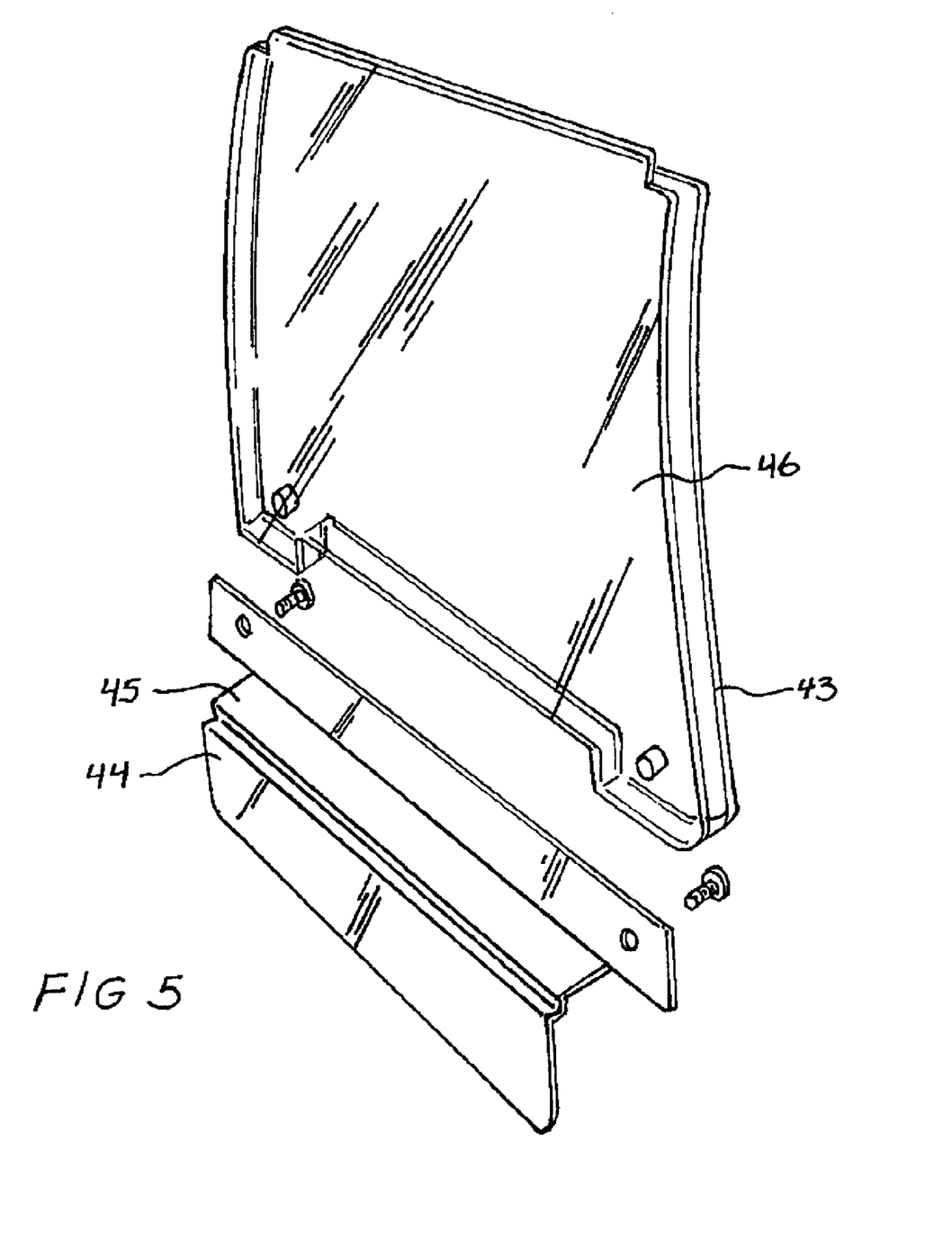
FIG. 5 is a perspective view of the window insert according to the second aspect of the present invention.

Moreover, for a second aspect of the invention, wherein the window insert is to be used primarily as a high impact resistant bullet proof shield, the window insert would be devoid of orifices as they are illustrated in FIG. 5. For these applications, the window insert may be manufactured of laminated layers 43 from plastics such as polycarbonate or acrylic or plastic laminates, or glass, or glass-plastic composites.

FIG. 5 illustrates the mounting bracket variation for the bullet proof window insert application. The mounting bracket 44 has an offset mounting plane 45 to accept varying thicknesses of the bullet proof window inserts 46, which provide different levels of protection. The offset mounting plane 45 also enhances air flow around the window insert 46, thereby preventing fogging in certain inclement weather conditions.

Ergonomically and aesthetically, it is desirable to have a curved window insert 46 which accomodates the natural contour of the curved glass window of most standard vehicles as FIG. 5 illustrates. However, it maybe less expensive to fabricate window inserts from a flat sheet of glass composite or glass-plastic composite.

FIG. 5 also illustrates one method of forming or manufacturing the window inserts of the present invention. As it may be appreciated, window shapes and sizes vary so greatly from automobile to automobile that the window inserts will be manufactured or formed to provide a custom fit in most applications.

Figure 6:
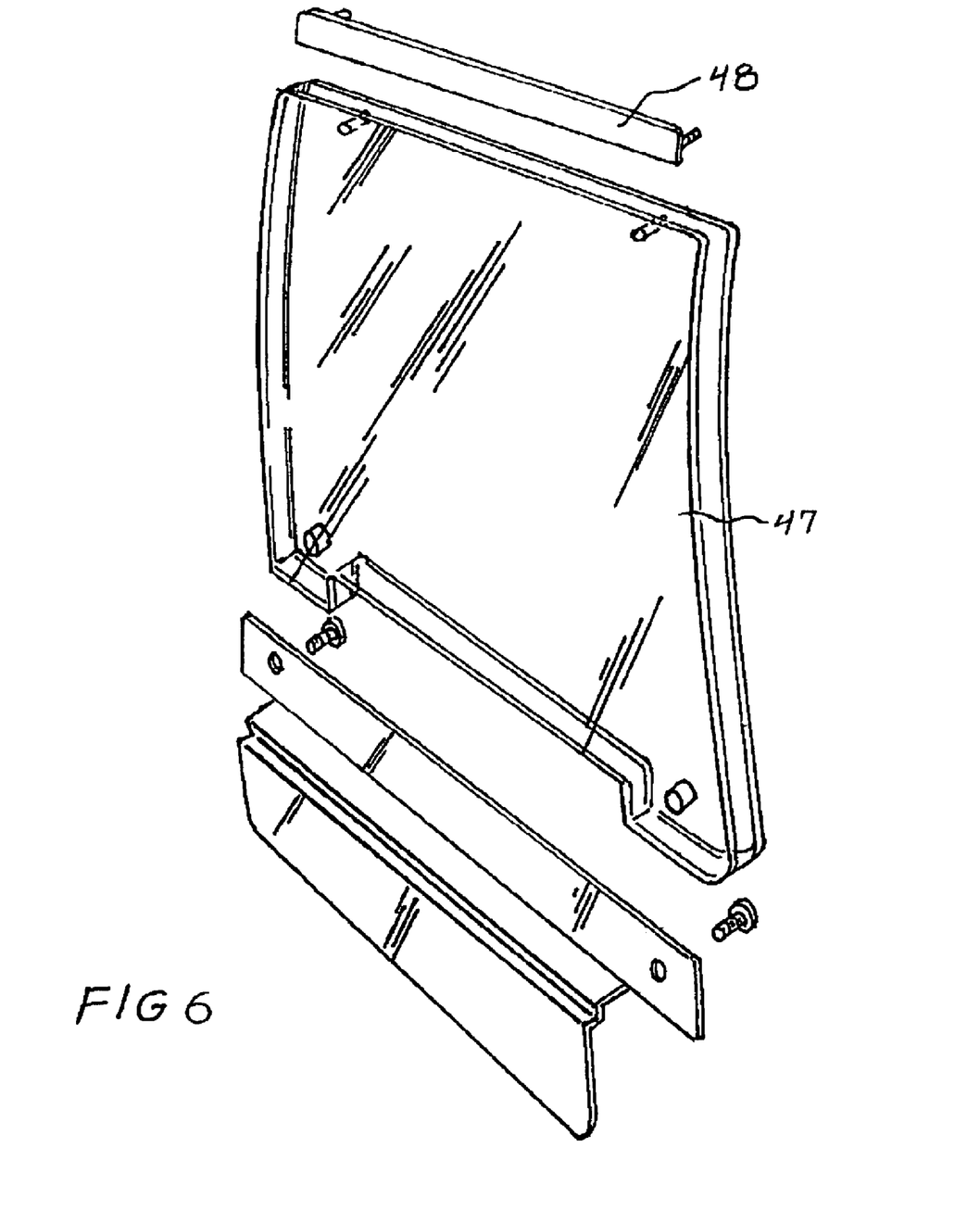
FIG. 6 is a perspective view of an alternative embodiment of the window insert according to the second aspect of the present invention.
Figure 7:
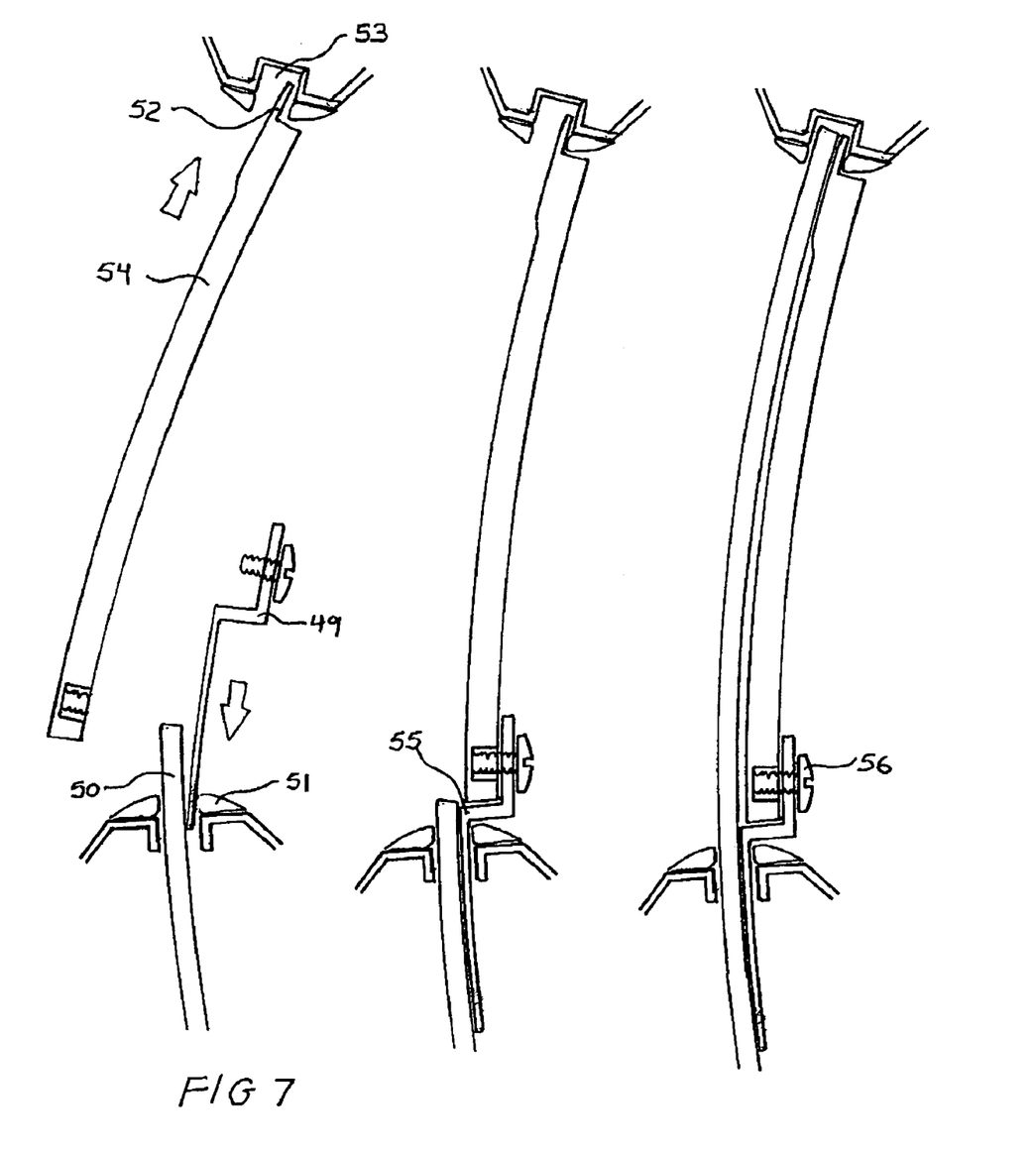
FIG. 7 is a section view illustrating the installation of the window insert.
Figure 8:
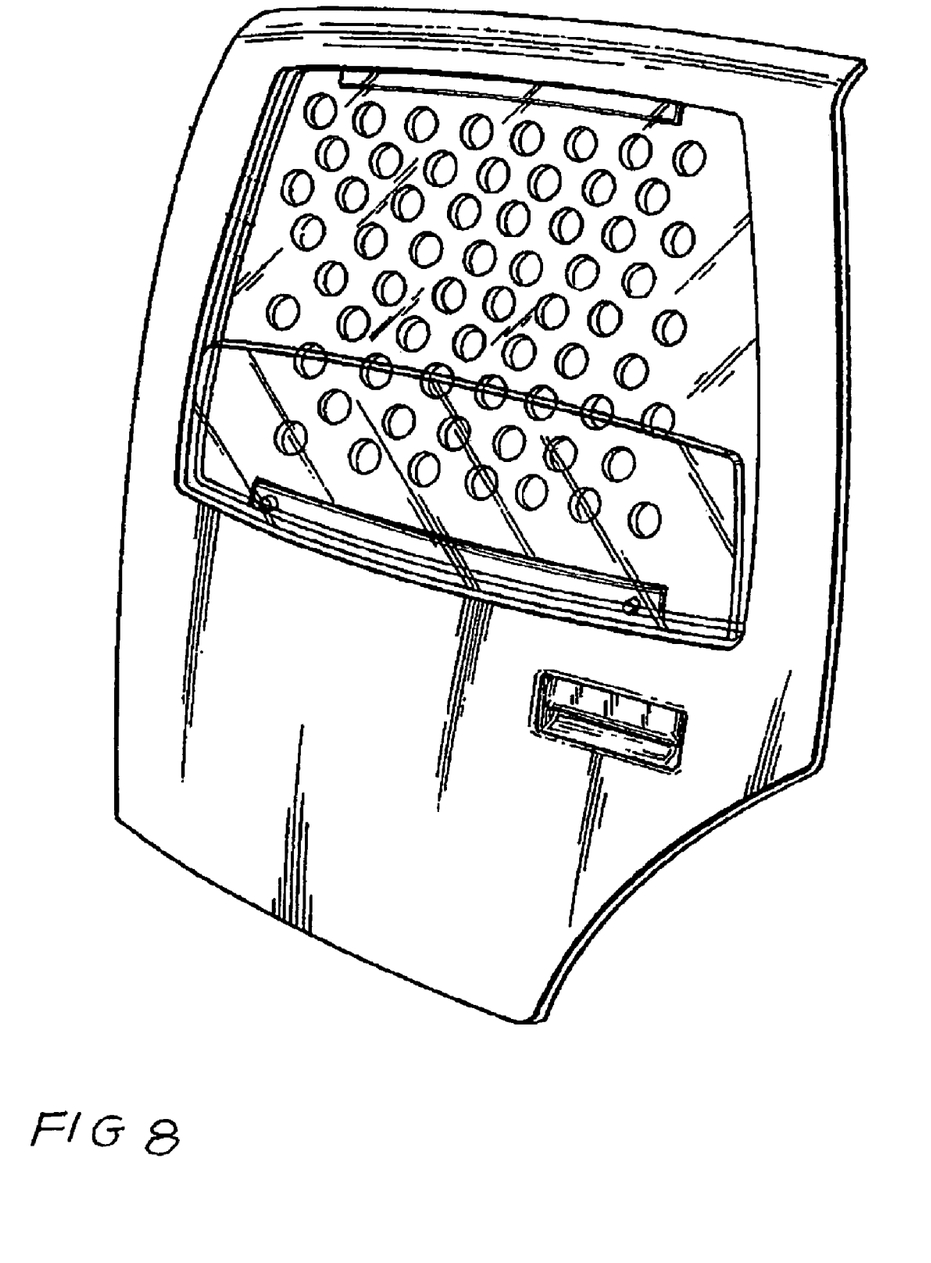
FIG. 8 is a perspective view of an installed window insert from the outside of the automobile.

FIG. 6 illustrates another alternative window insert embodiment where as the protruding edge 48 of the window insert 47 is fabricated from a separate material, such as a plastic or a metal, such as aluminum, or steel, is attached to the window insert in some manner, such as a fastener or adhesive. This may provide added strength to the window insert, provide solutions for an unusual application, or aid in manufacturing.

The invention claimed is:

1. A safety device in combination with a window frame in a motor vehicle having curved door windows having a contour defined by a retractable glass panel which is guided into a receiving frame which includes weatherstripping, the safety device comprising:

a curved window insert which accommodates said contour formed from a sheet of optically transmissive material, said window insert having an upper edge defined to be inserted, along with the retractable glass panel window, into an upper receiving channel of the window frame, said window insert having one or more fastening receivers; and a mounting bracket with a lower edge defined to be inserted between the retractable glass panel window and the weatherstripping of said window frame, said mounting bracket having a surface to receive the window insert, and said mounting bracket having one or more fasteners to retain the window insert.

2. The combination of claim 1 wherein said window insert is formed from a material selected from the group consisting of optically transmissive polycarbonates, acrylics, and plastics.

3. The combination of claim 1 wherein said window insert is formed from a bullet proof material.

4. The combination of claim 3 wherein said bullet proof material is selected from the group consisting of glass composite and glass/plastic composite and all plastic.

5. The combination of claim 1 wherein said window insert has the bottom edge notched to assist during installation and accept the mounting bracket.

6. The combination of claim 1 wherein said window insert is formed from a material selected from the group consisting of opaque polycarbonates, acrylics, and plastics.

7. A safety device in combination with a window frame in a motor vehicle having curved door windows having a contour defined by a retractable glass panel which is guided into a receiving frame which includes weatherstripping, the safety device comprising:

a curved window insert which accommodates said contour formed from a sheet of optically transmissive material, said window insert having an lower edge defined to be inserted, along with the retractable glass panel window, into a lower receiving channel of the window frame, said window insert having one or more fastening receivers; and a mounting bracket with an upper edge defined to be inserted between the retractable glass panel window and the weatherstripping of said window frame, said mounting bracket having a surface to receive the window insert, and said mounting bracket having one or more fasteners to retain the window insert.

8. The combination of claim 7 wherein said window insert is formed from a material selected from a group consisting of optically transmissive polycarbonates, acrylics, and plastics.

9. The combination of claim 7 where said window insert is formed from bullet proof material.

10. The combination of claim 9 wherein said bullet proof material is selected from the group consisting of glass composite and glass/plastic composite and all plastic.

* * * * *